United States Patent [19]

Yu et al.

[11] Patent Number: 5,056,150
[45] Date of Patent: Oct. 8, 1991

[54] METHOD AND APPARATUS FOR REAL TIME SPEECH RECOGNITION WITH AND WITHOUT SPEAKER DEPENDENCY

[75] Inventors: Tiecheng Yu; Ning Bi; Meiling Rong; Enyao Zhang, all of Beijing, China

[73] Assignee: Institute of Acoustics, Academia Sinica, Beijing, China

[21] Appl. No.: 433,098

[22] Filed: Nov. 8, 1989

[30] Foreign Application Priority Data

Nov. 16, 1988 [CN] China .................................. 88107791

[51] Int. Cl.$^5$ ................................................ G10L 5/00
[52] U.S. Cl. ..................................... 381/43; 364/513.5
[58] Field of Search ...................................... 381/41–46; 364/513.5

[56] References Cited

U.S. PATENT DOCUMENTS

4,412,098 10/1983 An .......................................... 381/43
4,516,215 5/1985 Hakaridani et al. ................... 381/43
4,573,187 2/1986 Bui et al. ............................... 381/43

*Primary Examiner*—Gary V. Harkcom
*Attorney, Agent, or Firm*—Armstrong, Nikaido, Marmelstein, Kubovcik, & Murray

[57] ABSTRACT

A method and apparatus for real time speech recognition with and without speaker dependency which includes the following steps. Converting the speech signals into a series of primitive sound spectrum parameter frames; detecting the beginning and ending of speech according to the primitive sound spectrum parameter frame, to determine the sound spectrum parameter frame series; performing non-linear time domain normalization on the sound spectrum parameter frame series using sound stimuli, to obtain speech characteristic parameter frame series with predefined lengths on the time domain; performing amplitude quantization normalization on the speech characteristic parameter frames; comparing the speech characteristic parameter frame series with the reference samples, to determine the reference sample which most closely matches the speech characteristic parameter frame series; and determining the recognition result according to the most closely matched reference sample.

18 Claims, 4 Drawing Sheets

METHOD AND APPARATUS FOR REAL TIME SPEECH RECOGNITION WITH AND WITHOUT SPEAKER DEPENDENCY

BACKGROUND OF THE INVENTION

The present invention relates to a speech recognition technique, and particularly relates to method and apparatus for quick and accurate recognition of various kinds of speeches. The great majority of existing speech recognition systems have been developed and implemented with high speed operational devices (e.g., TM 5320 series), mainly because these systems have adopted methods requiring a great number of operations as, these systems including linear prediction (LPC) parameters, dynamic programming and the like. Thus makes real time processing possible only when high speed operational devices are used. Other kinds of systems utilize the energy of each channel of a set of filters as parameter frame sequence, e.g., the patent entitled "Speech Recognition" to the Northern Telecommunication Corp. Ltd. (Patent Application No. CN 86100298A) and the patent entitled "A Method for Extraction and Recognition of Speech Features" to the Tsing Hua University (Patent Application No. CN 85100083A), although they have avoided the need for a great number of operations for extracting spectrum parameters, but either dynamic time warping or the so called features deblocking recognition scheme is used in the matching method between the unknown speech and the sample speech. Thus, the number of operations of the former is still great, while the informations of speech on the time series of the later are too strange, in fact they are similar to the long time spectrum parameters unacceptable in speech recognition. The level of noise immunity is an important criterion for the evaluation of the performance of a speech recognition system, for the parameters of LPC and cepstrum are very sensitive to the variation of spectrum, so that number of misrecognitions increase obviously in the recognition systems based on the above-metioned parameters when the background noise is relatively high. The existing recognition systems generally reguire the user to articulate normalizedly, stably, and with less freedom, thus causing the use of the recognition system inconvenient and increasing the psychological burden of the user, the cause of which is that linear compression of the time domain, determination of word number with length of time, or incomplete DP scheme are used by the developer. The space occupied by the reference samples determines the probable size of the word table of the system, and also influences the real-time performance of the system to a certain degree. For example, the speech recognition system of the Beijing Computer Xiang Yun Corp., 4K memory can only accomodate a word table of about 50 words.

SUMMARY OF THE INVENTION

The object of the present invention is to provide a high recognition precision, high real-time performance, large expandable work table, high noise immunity, and a high degree of independence of speech recognition with or without speaker dependency. Said speaker dependent speech recognition refers to a system requiring providing a set of speech samples of a speaker to the recognition system in advance, i.e., the speech of the user can only be recognized by the recognition system, after the starting of a set of speech reference samples. In contrast, speaker independent speech recognition refers to a system without the necessity of storing a set of a user's speech reference samples, its reference samples are general, capable of recognizing the speeches of multiple users.

The speaker dependent and independent speech recognition method according to the present invention, comprises the following steps:

a) Converting the speech signals into a series of primitive sound spectrum parameter frames;

b) Detecting the beginning and ending of speech according to said primitive sound spectrum parameter frames, to determine the sound spectrum parameter frame series;

c) Performing non-linear time domain normalization on said sound spectrum parameter frame series using sound stimuli, to obtain speech characteristic parameter frame series with predefined lengths on the time domain.

d) Parforming amplitude quantization normalization on said speech characteristic parameter frames;

e) Comparing said speech characteristic parameter frame series with the reference samples, to determine the reference sample which most closely matches the speech characteristic parmeter frame series; and f) Determining the recognition result according to said most closely matched reference sample.

The advantages of the speaker dependent and independent speech recognition method and apparatus constructed according to the present invention lie in:

For the speaker dependent speech recognition system:

(1) High real-time processing capability; changing the original procedure requires a large amount of multiplications and additions in a procedure wherein only logical XOR operations are needed, thus real-time processing with a word table containing 2000 words can be realized without high speed digital processing devices or chips.

(2) High recognition rate: in case of ordinary word table (200 oral commands), the correct recognition rate reaches 99%.

(3) Low memory occupation: computational matching portion of recognition execution occupies 2KB only, each speech sample occupies 30 bytes.

(4) High noise immunity: can work normally in relatively high noise environments.

(5) High articulation freedom: to the speed and volume of articulation, there is no very stirct requirement, non-linear articulation to a certain degree is allowed.

For the speaker independent speech recognition system:

(1) High real-time performance: real-time processing is possible when the size of the table is 200.

(2) High recognition rate: in the test of 31 oral commands, each including several numerals from the 10 digits "0–9", the correct recognition rate for speakers participated in training is 99%, and that for speakers not participating in training is 95%.

DETAILED DESCRIPTION OF THE INVENTION

The following is a further detailed description of the present invention with reference to the drawings.

Figure 1:
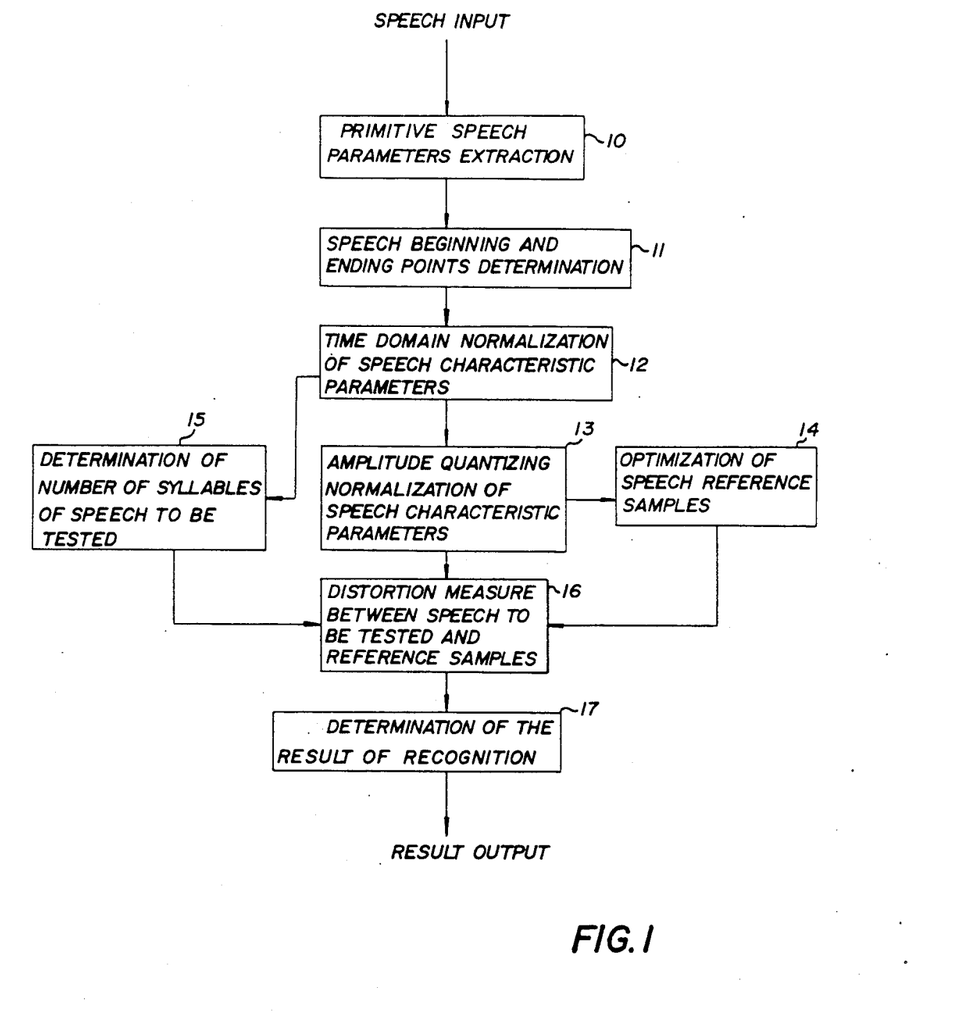
FIG. 1 is the flowchart of the speaker dependent and independent speech recognition according to the present invention.

FIG. 1 illustrates a flowchart for implementing the speaker dependent and independent speech recognition method according to the present invention, the flowchart comprises the following steps:

(I) Primitive speech parameters is performed as follows.

A primitive speech parameters extraction step (10) uses an apparatus which converts the speech signals into a series of primitive sound spectrum parameter frames. The primitive speech parameter frame series may select parameters of the following types as required: the energy output of each channel of the bandpass filter set, slope or variation parameter of the frequency spectrum, cepstrum parameter with Back's calibration or Mel's calibration, LPC parameter, and so on. The desired sampling period is 10-20 ms. The present invention adopts parameter of the energy output of each channel of the bandpass filter of frequency spectrum variations, wherein the frequency spectrum variation parameter refers to the difference of adjacent channels energies of the bandpass filter set. The set of digital differences obtained after A/D conversion of a set of outputs of the bandpass filter set at a certain instant, i.e., a set of data produced by sampling the speech signals on different frequency domains at a certain instant, is referred to as a parameter frame, or a speech vector.

(II) A step for determination of the beginning and ending points of the speech (11) includes an apparatus for determining the beginning and ending points of speech according to a series of parameter frames provided by the primitive speech parameter extraction (10).

The beginning of a sound is determined by the energy of the full passing or almost full passing capacitor network exceeding a certain, for example, 20 db, threshold and maintaining it for a certain time interval, for example 200 ms, while the ending of a sound is determined by the energy of the channel continuously below a certain level, for example, 25 db, threshold and maintaining it for a certain time interval, for example 150 ms. Provided that the sampling period of the primitive speech parameter frame series is 10 ms, and the quantization precision is 8 bits, then the time thresholds of determining the beginning and ending points of speech can be set to 20 frames and 15 frames respectively, and the energy thresholds to 20 and 25 respectively. The above set time and energy thresholds can be reset according to the conditions of background noise at the time using the apparatus, when the background noise is high, the thresholds can be raised accordingly.

(III) Time domain normalization of the speech characteristic parameters are discussed as follows.

A time domain normalization of the speech characteristic parameter step (12) performs nonlinear time domain normalization with sound stimuli to extract speech characteristic parameter frames used for creating speech reference samples and matching recognition, from the primitive speech parameter frame series provided by the primitive speech parameter extraction step (10) and the determination of the beginning and ending points of speech step (11). The objective of performing non-linear time domain normalization on the primitive speech parameter frame series with sound stimuli parameters is to sufficiently stress the importance of the transient phonetic segment and compress the stable part of the vowel, so as to obtain equal local speech characteristic parameter frame series on the time domain. Thus the amount of information necessary to be stored can be reduced, and complex DP computations can be avoided, and the speed of recognition can be raised greatly, besides, the problem of influence of the variation of articulation speed on the correctness of recognition can be solved. The specific method is as follows: providing that the primitive speech parameter frame at time $T_i$ is $B(T_i) = \{A_{i1}, \ldots, A_{i,j}, \ldots, A_{i,L}\}$, where $A_{i,j}$ is a component of the L dimensional speech parameter frame, applying 30 ms smoothing to it on the time domain, we have $B'(T_i) = \{P_{i1}, \ldots, P_{i,j}\}$, where $P_{i,j}$ is a component of the L dimensional speech parameter frame after smoothing $P_{i,j} = \frac{1}{4}A_{(i-1),j} + \frac{1}{2}A_{i,j} + \frac{1}{4}A_{(i+1),j}$. The primitive speech parameter frame series after smoothing processing $\{B'(T_1), B'(T_2), \ldots, B'(T_j), \ldots\}$ is sent to {" determination of syllable number of speech to be tested" (15) to determine the of number syllables of speech. The sound stimulus at $T_i$ is defined as:

$$\delta_i = \sum_{j=1}^{L} |F_{i,j} - F_{(i-1),j}|$$

$$= \frac{1}{4} \sum_{j=1}^{L} |A_{(i+1),j} + A_{i,j} - A_{(i-1),j} - A_{(i-2),j}|$$

When sampling precision equals 8 bits, then $\delta_i = 0$ providing $|P_{i,j} - P_{(i-1),j}| \leq 2$. If the frame number of sampling of a Phonetic segment is N, then we have the sound stimuli series $\{\delta_1, \delta_2, \ldots, \delta_N\}$, the total stimulus of this phonetic segment is:

$$\Delta = \sum_{i=1}^{N} \delta_i$$

If M parameter frames are to be selected for characterizing this segment of speech, i.e. normalizing this segment of speech into M frame lengths, then the average sound stimulus can be defined as:

$$\Delta = \Delta/(M+1)$$

Taking $\Delta$ as the threshold for selecting spectrum, the method for determining the M speech characteristic parameter frames is as follows:

(a) reset the sound stimuli accumulator (w): $w = 0$;
(b) sequentially fetch the next sound stimulus $\delta_i$, add it to the sound stimuli accumulator $w = w + \delta_i$;

(c) if $w \geq \Delta$, the ith frame is selected, and branch to (e);

(d) else, the ith frame is not selected, branch to (b);

(e) assign the ith selected frame with selected frame's serial number, and express it with $C(m) = \{P_{m,1}, P_{m,2}, \ldots, P_{m,L}\}$, then reduce the sound stimuli accumulator by $\Delta$, $w = W - \Delta$;

(f) determine whether M vectors have been selected, i.e., $m \geq M$; if so, stop, else branch to (c).

A speech characteristic parameter represented by M rectors $\{ (cm) \}$ $m = 1, \ldots M$, can be obtained from the above process, which is sent to the "amplitude quantization normalization of speech characteristic parameter" (13), to perform amplitude quantization normalization.

The number of speech characteristic parameter frame M is generally set to near 20, and it can be appropriately adjusted according to the number of syllables of the contents of the recognition vocabulary, and could be 4-6 times of the number of syllables.

The vocabulary can the defined by the user according to the requirement of specific usage, for example it can be defined to be a set of special control command statements, 1244 different syllables of the chinese Language, 10 numeric digits, etc.. In summary, each item of the vocabulary can be a word, compound work, or statement.

(IV) Amplitude normalization by requantizing the speech characteristic parameters "Amplitude quantizing normalization of the speech characteristic parameter" (13) performs amplitude adaptive requantizing normalization on the speech characteristic parameter frames provided by the "time domain normalization of the speech characteristic parameters" (12). For further compressing the amount of information required to be stored, and overcoming the variations of input signal energies due to variations of the voice volume and the distance between the speaker and the microphone. The quantization precision can be selected from 1-8 bits. The method of one bit quantization is as follows:

Provided the energy outputs of each channel of the band pass filter set taken as parameters, the average value $\bar{P}_i = 1/L \ \Sigma P_{i,j}$ can be obtained from the non-linear time domain normalized speech characteristic parameter frame $C_{(i)} = \{P_{i1}, P_{i,2}, \ldots, P_{i,L}\}$, and this average value is used to perform one bit quantization on each component of this parameter frame:

$$P_{i,j} = \begin{cases} 0 \text{ where } P_{i,j} < P_i \\ 1 \text{ where } P_{i,j} \geq P_i, j = 1, 2, \ldots L \end{cases}$$

If the variations of the frequency spectrum are taken as parameters i.e. the differences between adjacent parameters in a frame), one bit quantization is performed as follows:

$$P_{i,j} = \begin{cases} 0 \text{ where } P_{i,j} < 0 \\ 1 \text{ where } P_{i,j} \geq 0, j = 1, 2, \ldots L \end{cases}$$

One bit quanting normalization of the speech characteristic parameter frame can significantly reduce the required storage space, the recognition vocabulary can be expanded by more than 10 times with the same memory capacity; besides, one bit quantization enables us to apply XOR operations instead of subtraction operations thus significantly reduces the required time to evaluate the difference between the frame to be tested and the reference sample. At the same time, the noise immunity of the system can be improved.

When n bits are selected as the quantization precision ($n = 2, \ldots 8$), the amplitude normalization of each frame is:

$$P'_{i,j} = \frac{P_{i,j}}{\max_{1 \leq j \leq L} \{P_{i,j}\}} 2^n - 1$$

The number of misrecognitions done to the variation of the speech level is reduced by the using of normalized characteristic parameters in recognition.

The generations of reference samples and speech characteristic parameter frames to be tested are all necessary to be performed through the above steps, in fact, the reference samples and the speech characteristic parameter frame to be tested are the same, the difference between them lies in that the reference samples are generated by the articulation of the speech input speaker according to the specified vocabulary, while the speech characteristic parameter frames to be test are generated by the speech inputs of the speaker according to the requirement of himself.

In a speaker dependent speech recognition system, the reference samples must be generated before the actual speech inputs.

(V) Optimization of the speech reference samples

Through the above steps, the speech characteristic parameter frame series with equal length and used in speaker dependent recognition as well as the reference sample series have been generated. In speaker independent speech recognition, the above reference sample series should be further optimized, to created speech reference samples independent to a specific user, "optimization of the speech reference samples" (14) performs this task, its specific steps are as follows:

(a) Repetitively reading the vocabulary by multiple speakers, the articulation of each time is applied the time domain normalization and energy domain normalization using the above steps (I)-(IV). Each item of the vocabulary is processed independently, i.e., the multiple articulations of the same item in the vocabulary, is generated a subcode book series respectively, according to the order in the speech characteristic parameter frame series. The code book constructed by this series is arranged strictly according to the time sequence.

(b) Each subcode book is generated from small to large, once in crement by one. The process for the generating of a code book $B_{v+1}$ containing $v+1$ code words from the code book $B_v$ constituted by v code words is: select the code work with maximum average distance from the code words having more than two members in $B_v$, applying small perturbation to generate two primitive centers, with the other unchanged. Perform optimization loop on these $V+1$ primitive centres to obtain $B_{v+1}$.

(c) Eliminate the blank subspace occasionally occurred, and generate a supple mental code word with the method of (b).

The reference samples of a speaker independent speech recognition system can be expressed as:

$$R^{(k)} = \{r'_{i,j,p}{}^{(k)}\}$$

where i = 1, 2, ..., M
j = 1, 2, ..., L
p = 1, 2, ..., V
K = 1, 2, ..., N

In addition, during the generation of the code book, it is considerable to generate different subcode book series respectively for the voice of man and woman and speech samples of various language families, and combining them in use. Experimental tests have proved that this method is better than the method of generating a single subcode book series for all speeches, the correct recognition rate can be increased.

Of course, this optimization method can also be used in the generation of reference samples for speaker dependent speech recognition.

(VI) Determination of the number of syllables of the speech to be tested

"Determination of the number of syllables of the speech to be tested" (15) determines the number of syllables in the speech to be tested. The determination mainly relies on the state of variation of the sound stimuli. The following operations are applied to the parameter frame series $\{B'(T_1), B'(T_2), \ldots B'(T_i), \ldots\}$, where $B'(T_i) = \{P_{i,1}, P_{i,2}, \ldots P_{i,L}\}$, from the "time domain normalization of the speech characteristic parameters" (12): let $$\delta'_i = \sum_{j=1}^{L} (P_{i,j} - P_{(i-1),j}).$$

when $\delta'_i$ is negative for continuously more than 8 frames then a syllable is determined to have ended, or when $\Sigma \delta'_i$, where $L_2 - L_1 = 6$, is negative for continuously more than 8 frames, then a syllable is determined to have ended. The above parameters can be adjusted accordingly according to the sampling rate and speed of articulation. The number of syllables thus determined is sent to the "Distortion measure between the speech to be tested and the reference sample" (16), the evaluation of difference is limited in the word items of the vocabulary with approximate number of syllables, i.e., limiting the search range of the recognition vocabulary, thus the time required for evaluation is reduced.

(VII) Evaluation of the difference between the speech to be tested and the reference sample "Distortion measure between the speech to be tested and the reference sample" (16) is used to compare a speech characteristic parameter frame series with the reference samples, and determine which reference sample is the most matching one. Difference evaluations are limited in the range of the vocabulary provided by the "determination of number of syllables of the speech to be tested", i.e., if the number of syllables of a certain word item is significantly different from that of the speech to be tested, then it is impossible to be the result of recognition and unnecessary to evaluate its difference with the speech to be tested. The characteristic parameter frame of the speech to be tested and the reference samples both come from the results obtained in "amplitude quantizing normalization of speech characteristic parameters" (13), while the reference samples in speaker independent speech recognition comes from "optimization of the speech reference samples" (14).

In a speaker dependent speech recognition system, wherein the size of vocabulary is N, the number of frames of each speech characteristic parameter frame series is M, and the number of components of each parameter frame is L, the speech reference sample can be expressed with the following expression:

$$R^{(k)} = \{r_{i,j}^{(k)}\}, \begin{array}{l} j = 1, 2, \ldots, L, \\ i = 1, 2, \ldots, M, \\ k = 1, 2, \ldots, N. \end{array}$$

And the speech sample to be tested is expressed by X:

$$X = \{X_{i,j}\} \begin{array}{l} j = 1, 2, \ldots, L, \\ i = 1, 2, \ldots, M. \end{array}$$

When the parameter precision is one bit, the difference between the speech to be recognized and the reference sample evaluated by Hamming distance is:

$$d^{(k)} = \sum_{i=1}^{M} \sum_{j=1}^{L} (X_{i,j} \oplus r_{i,j}^{(k)}), k = 1, 2, \ldots, N.$$

where "$\oplus$" expresses XOR operation, which can reduce a lot of operation time as compared with multiplication and addition. While the parameter frame is quantized with 2-8 bits, city-block distance or Euclidean distance is used for evaluation the difference, i.e.:

$$d^{(k)} = \sum_{i=1}^{M} \sum_{j=1}^{L} |X_{i,j} - r_{i,j}^{(k)}|, K = 1, 2, \ldots, N;$$

or $$d^{(k)} = \sum_{i=1}^{M} \sum_{j=1}^{L} (X_{i,j} - r_{i,j}^{(k)}), K = 1, 2, \ldots, N.$$

Arrange the difference evaluations in order with the principle of least distance:

$$d^{(n1)} \leq d^{(n2)} \leq d^{(k)},$$

$K = 1, 2, \ldots N, K \neq N_1, N_2$

Where $n_1$, $n_2$, and K are the order number of the terms in the vocabulary corresponding to the reference samples, wherein item $n_1$ is the most matching one with the speech to be tested, item $n_2$ is the second most matching one, and item K is the K-th most matching one.

In a speaker independent speech recognition system, each reference sample is expressed by a code book, each sub-code-book of the code book, which is strictly arranged in sequence of the time series, contains V code words. When the speech characteristic parameter frame is being compared with the sub-code-book series of the reference samples, the most similar code word to the speech parameter frame is selected as the basis to accumulate the similarity of the speech to be tested to the reference samples. Providing that the reference samples of the speaker independent speech recognition system are expressed with:

$$R^{(k)} = \{r'_{i,j,k,}{}^{(k)}\},$$

j=1,2, ... L,
i=1,2, ... M,
P=1,2, ... V,
K=1,2, ... N,
then the differences are:

$$d^{(k)} = \sum_{i=1}^{M} \sum_{j=1}^{L} \min_{p=1,\ldots V} (X'_{i,j} - r'^{(j)}_{i,j,p})^2).$$

where K=1,2, ..., N.

The other steps are the same as that of the speaker dependent procedure.

(VIII) Judgement of the recognition result

"Determination of the recognition result" (17) utilizes the results provided by "Distortion measure between the speech to be tested and the reference samples" (16), together with the limitation of the discretion thresholds, to make judgement of the final recognition result. If the speech to be tested matches the most to the $n_1$th item of the vocabulary, and the second most to the $n_2$th item, i.e., we have the difference parameter;

$$d^{(n1)} \leq d^{(n2)} \leq d^{(k)},$$

K=1,2, ... N, K≠n1, n2
then the discretion is defined as $$\frac{d^{(n2)} - d^{(n1)}}{d^{(n1)}},$$

and its threshold is generally defined as 0, 1. If the discretion is less than this threshold, recognition is rejected. If the discretion is greater than or equal to this threshold, then the recognition result is output.

Figure 2:
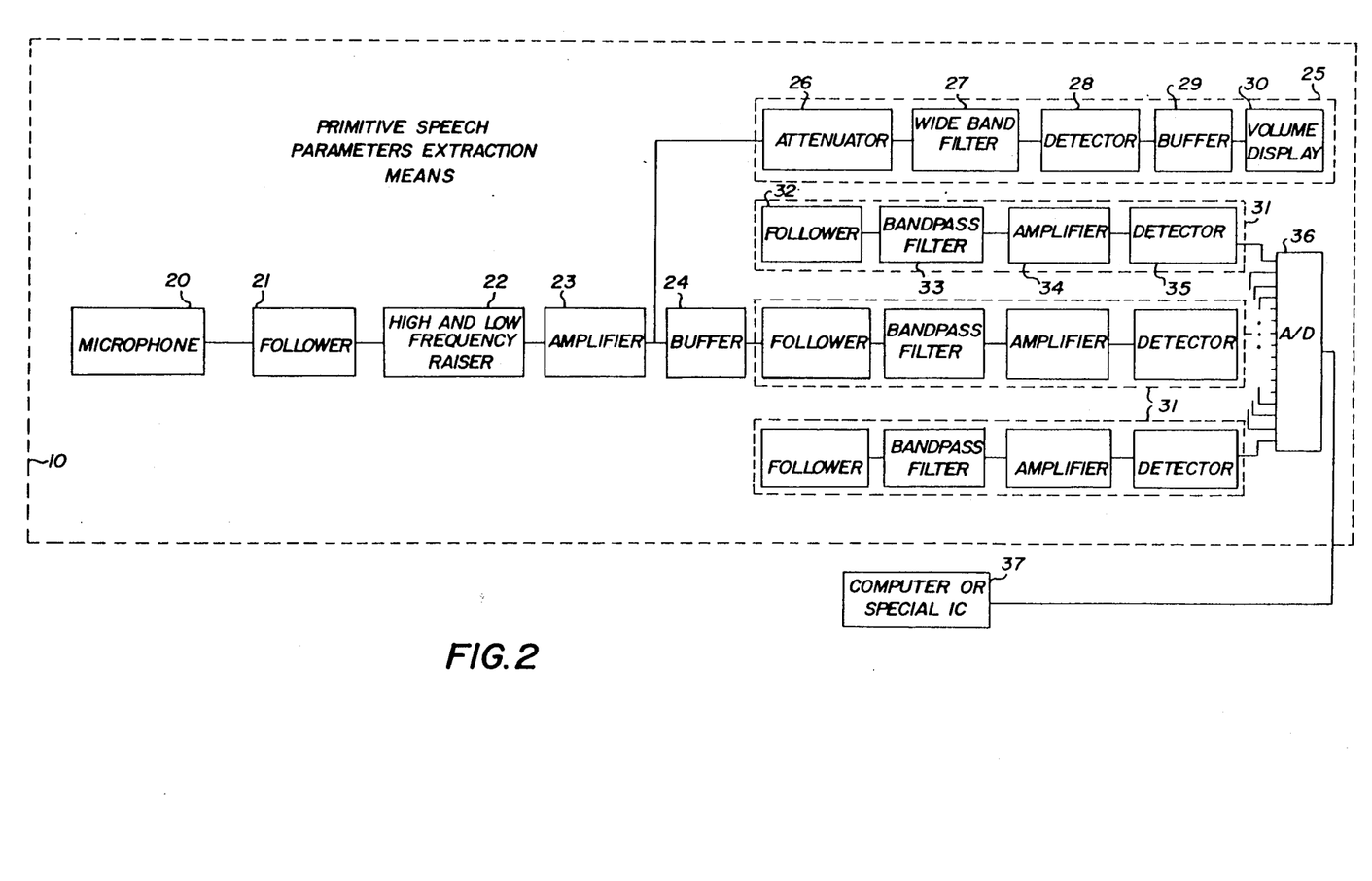
FIG. 2 is the hardware block diagram of an embodiment of the speaker dependent and independent speech recognition apparatus according to the present invention.

FIG. 2 in the hardware block diagram of a preferred embodiment of the speaker dependent and independent speech recognition apparatus according to the present invention.

Microphone 20 converts the speech signals into electrical signals, the electrical signals pass through follower 21, so as to provided low impedance output signals.

The output of follower 21 is connected to high and low frequency raiser 22, which weights the high frequency component of the speech signal to overcome the phenomenon of weakness of the consonants, which is helpful to improve the sensitiveness of the present apparatus to the consonants. For the purpose of improving the recognition rate of the recognition system to woman's voice, besides the raising of high frequency, raising is also performed to the low frequency end.

The output of high and low frequency raiser 22 is completed with the input of amplifier 23, which selects the appropriate amplification with respect to the maximum allowable input dynamic range of the A/D converter used and the sensitiveness of the microphone, for fully utilizing the input dynamic range of the A/D convertor, which is advantageous to the further digital speech signal processing.

The output of amplifier 23 is coupled to the volume display circuit constituted of attenuator 25, wide band filter 26, detector 27, buffer 28, and volume display 29, this display circuit is used for the user to monitor and control the volume of speech, as well as to adjust the amplification of amplifier 23 according to the volume display. In the embodiment of the present invention, the bandpass frequency of wide-band filter 26 is 200-6300 Hz. Volume display 29 is constituted of the comparison circuit and seven columns of level displays, each column of level display represents a specific level.

The output of amplifier 23 is connected with buffer 24, and the output of buffer 24 is connected with a 16-channel sound spectrum extraction circuit, which is constituted of follower 30, bandpass filter 31, amplifier 32, and RMS detector 33, the central frequency of the bandpass filter of each channel is different from one another, their central frequencies are divided according to ⅓ October frequency apart between 200 and 6300 hz, for extraction of 16 frequency components. The RMS detector performs the following calculation on the speech signal:

$$RMS = \sqrt{\frac{1}{T} \int_0^T [f(t)]^2 dt} \quad.$$

so as to obtain the energy values of the speech signal on different frequency bands.

The outputs of the 16-channel sound spectrum extraction are coupled respectively with an A/D convertor having 16 input terminals. The A/D convertor converts the analogic speech signal into an 8-bit digital signal. The computer samples the 16-channel signals in turn with sampling frequency about 100 Hz.

The output of the A/D convertor is coupled with the computer or special speech recognition IC 35.

Microphone 20, follower 21, high and low frequency raiser 22, amplifier 23, buffer 24, the sound spectrum extraction circuit (constituted of follower 30, bandpass filter 31, amplifier 32, and detector 33), and A/D convertor 34 in FIG. 2, perform the work of "primitive speech parameter extraction" (10) illustrated in FIG. 1.

Figure 3:
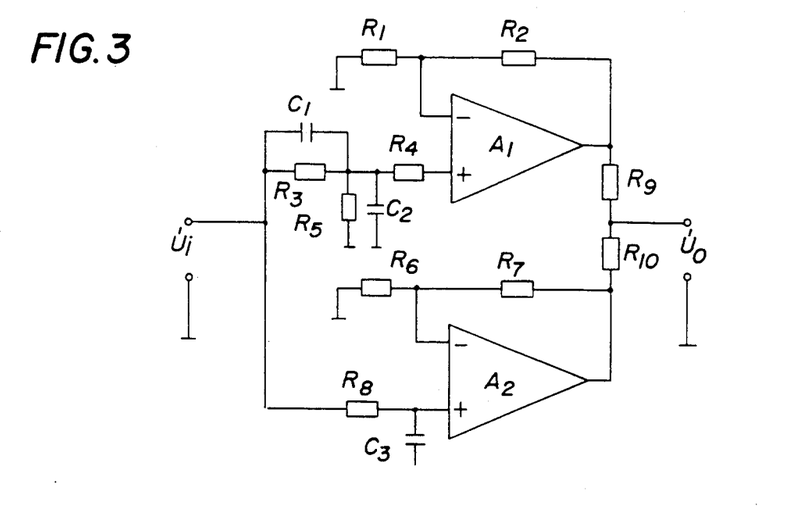
FIG. 3 and FIG. 4 are respectively the high and low frequency raising circuit of the recognition apparatus of the present invention and its frequency characteristic curve.

The electronic circuits used in FIG. 2 are conventional general electronic circuits, except that the high and low frequency raiser 22 is specifically designed for extracting the speech parameters, its circuitry is illustrated in FIG. 3, which is constituted of powered high frequency raising circuit and low frequency raising circuit.

Figure 4:
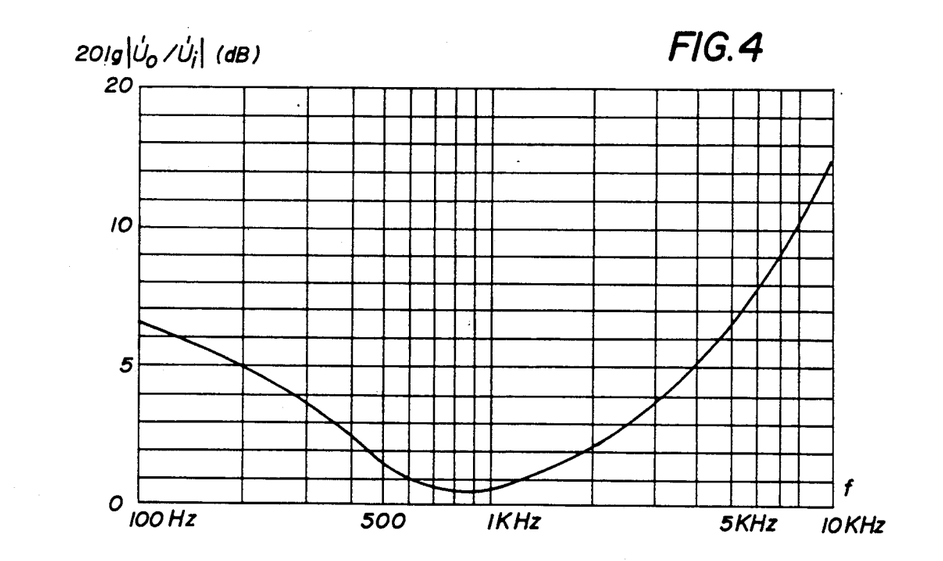

The selection and calculation of the element values in the circuitry illustrated in FIG. 3 are as follows:

$R_3 = 10K\Omega$, f=2340 Hz, $f=\frac{1}{2}\pi R_3 C_1$ $C_2 = [(R_3+R_5)/20R_5-1]C_1$ $A_G = 11$ in the circuitry $R_8 = 10K\Omega$, f=234 Hz, $f=\frac{1}{2}\pi R_8 C_3$ $R_1+R_2/R_1 = R_3+R_3/R_5$ $R_4 = R_1 R_2/R_1 + R_2 - R_3 R_5/R_3 + R_5$ $R_8 = R_6 R_7/(R_6+R_7)$ $R_9 = R_{10} = 9.1K\Omega$ FIG. 4 illustrates the frequency characteristic curve of the high and low frequency raiser 22.

Figure 5:
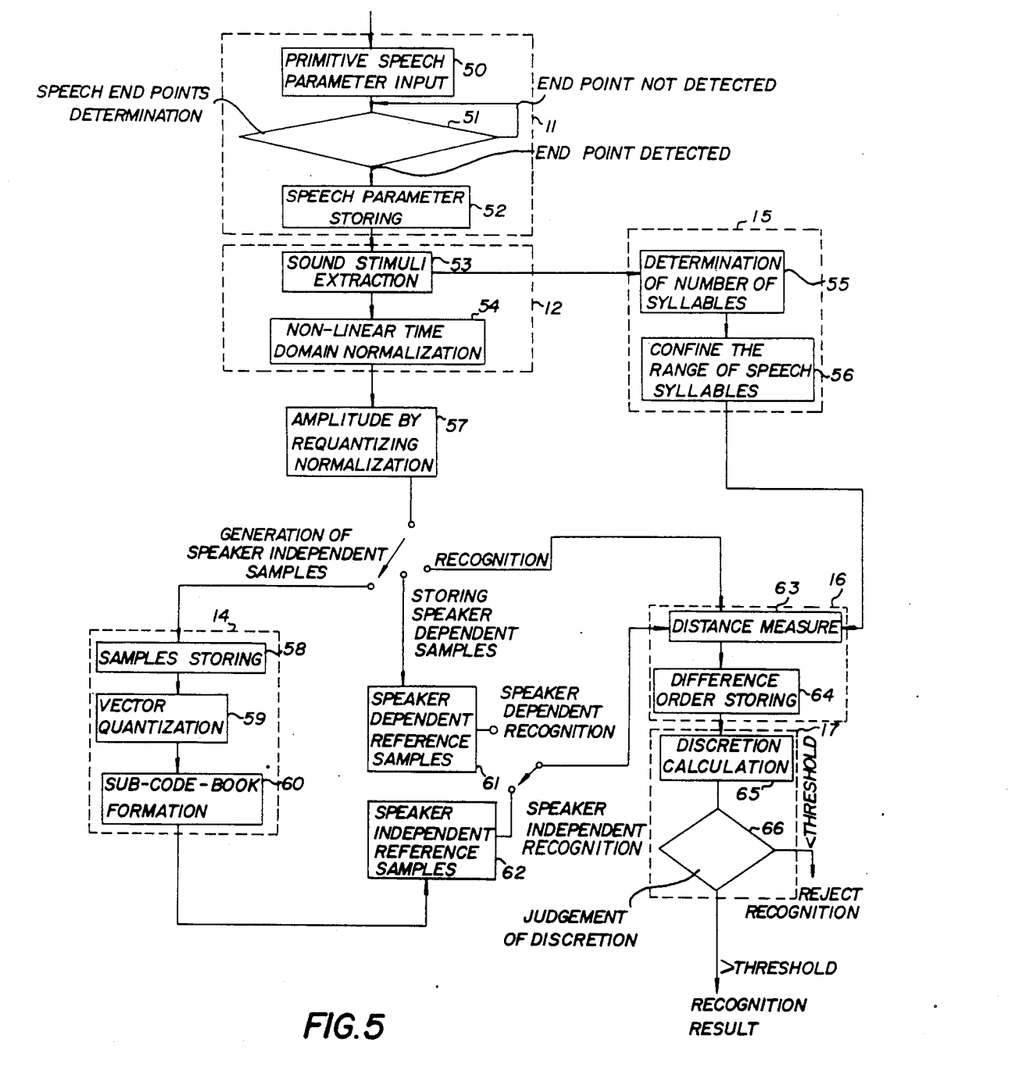
FIG. 5 is a software flowchart of a preferred embodiment of the speaker dependent and independent speech recognition apparatus according to the present invention.

FIG. 5 shows the software flowchart of a preferred embodiment of the speaker dependent and independent speech recognition apparatus according to the present invention.

The "primitive speech parameter input" module (50) inputs the digitized energy output of each channel of the multiple channel filter set provided by the primitive speech parameter extraction apparatus to the counter, in the present embodiment, 16 channels are used for obtaining 16-dimensional speech characteristic parameter frames. The "Speech end points determination" module (51) determines the beginning and ending points of the primitive speech parameters. It takes the sum of the energies of the 16 channels (i.e., the energy of the C network) as basis of determination. If the energy exceeds a specified threshold and maintains for a certain times interval, then a beginning of speech is determined, and the speech parameter frame is sent to the "speech parameter storing" module (52) according to the time sequence, after that, the "Speech end points determination" module (51) performs ending determination to the speech parameter frame series. If the sum of the energies of the 16 channels is less than another specified threshold and maintains for a certain time interval, then an ending of speech is determined, at that time, the sending of speech parameters to the "speech parameter staring" module (52) stops. Module (50), module (51), and module (52) correspond to "determination of the beginning and ending points of speech" (11) illustrated in FIG. 1. The speech segment stored in the "speech parameter storing" module (52) is sent to the "sound stimuli extraction" module (53) for calculating the value of the sound stimulus, the calculation is carried out according to the formulas described in the "time domain normalization of the speech characteristic parameter" (12) of FIG. 1. The calculated sound stimulus is sent to the "nonlinear time domain normalization" module (54). The smoothed speech parameters are sent to the "determination of number of syllables" module (55). The "nonlinear time domain normalization" module (54) performs non-linear time domain normalization with the method described in the "time domain normalization of the speech characteristic parameters" (12) of FIG. 1, so as to obtain speech characteristic parameter frames series of predefined length. Modules (53) and (54) correspond to the "time domain normalization of the speech characteristic parameters" (12) in FIG. 1. The speech characteristic parameter series with equal length is adaptive requantized by the "Amplitude normalization by requantizing" module (57), which corresponds to the "amplitude quantizing normalization of the speech characteristic parameter" (13) in FIG. 1, and the normalization method of which is the same as that described in (13).

The output of the "Amplitude normalization by requantizing" module (57) has three branches: "recognition", "storing speaker dependent recognition sample", and "generating speaker independent recognition sample". When the speech recognition system of the present invention is operating in the speaker dependent mode, the output of the "Amplitude normalization by requantizing" module (57) should be input to the "storing speaker dependent recognition sample" branch first, the new speaker should articulate according to a specified vocabulary first, to generate the speaker dependent reference samples; then the output of module (57) is transferred to the "recognition" branch, the speaker makes actual speech input, and the system performs recognition using the reference samples generated by the same speaker. When the speech recognition system is operating in the speaker independent recognition mode, the speech inputs of many speakers according to the same specified vocabulary are needed, and speaker independent reference sample are generated by the system, and during the succeeding speech recognition, the output of the "amplitude quantizing normalization" module (57) is transferred to the "recognition" branch, and the recognition is based on the reference samples generated in advance, the "generating speaker independent sample" branch is used for generating these samples.

The output of the "Amplitude normalization by requantizing" module (57) is sent to the "Storing speaker dependent samples" module (61), during recognition, module (61) outputs reference samples to be used by the "Distance measure" module (63).

The multiple articulations of the same item in the vocabulary after amplitude quantizing normalization are sent to the "speech sample storing" module (58), which stores in divisional sets all the training speech samples with the same content. The "frame quantization" module (59) sequentially performs frame quantization on each set of samples with clustering algorithm to generate sub-code-books, and sends them to the "Sub-code-book formation" module (60), which arranges the separately generated sub-code-books into a sub-code-book series according to the time series, the specific steps of which are as those described in the "optimization of the speech reference sample" (14) of FIG. 1. The output of module (60) is sent to the "speaker independent reference samples" module (62). During the operation of speaker independent speech recognition, the output of module (62) is sent to the "Distance measure" module (63).

The smoothed primitive speech parameters output by the "sound stimuli extraction" module (53) are input to the "determination of number of syllables" module (55), for determining the number of syllables in the speech to be tested, the determination uses the method described in "determination of the number of syllables in the speech to be tested" (15) illustrated in FIG. 1. The number of syllables obtained by module (55) is sent to the "Confine the range of speech syllables" module (56), which specifies the range of syllables of the speech to be tested according to the number of syllables, and the output of which is sent to the "Distance measure" module (63). Modules (55) and (56) correspond to "determination of the number of syllables in the speech to be tested" (15) of FIG. 1.

During recognition, the "Distance measure" module (63) accepts first the output of the "Confine the range of speech syllables" module (56), which outputs a range of syllables having to be possessed for recognizing an item, limitting the evaluations of the differences between the speech to be tested and the reference samples in this range only, to reduce the time of recognition. In speaker dependent speech recognition, the "Distance measure" module (63) matches the characteristic parameter frame of the speech to be tested provided by module (57) with the speaker dependent reference samples provided by module (61), and calculates the differences between the speech to be tested and each item of the reference samples. While in speaker independent speech recognition, the "Distance measure" module (63) calculates the differences between the speech to be tested and the reference samples using the speech characteristic parameter frame and the speaker independent reference samples provided by module (57) and module (62) respectively.

The difference evaluation of module (62) adopts the method described in "Distortion measure between the speech to be tested and the reference sample" (16). The differences between the speech to be tested and the reference samples obtained in module (63) are sent to the "differences sorting" module (64), which sorts the difference values between the speech to be tested and the reference samples in increasing order, and lists sequentially the ordinal numbers in the vocabulary of the first several reference samples with least differences from the speech to be tested. These ordinal numbers and the corresponding difference values are sent to the "discretion evaluation" module (65). Moudles (63) and (64) correspond to "Distortion measure between the speech to be tested and the reference sample" (16) in FIG. 1.

Module (65) calculates the discretion value of the primitive result, and sends this value to the "discretion dermination" module (66), which tests the discretion value to determine whether it is greater than or equal to a specified threshold. In the present embodiment, this threshold is specified as 0.1; if the discretion is less than this threshold, then recognition is rejected; else, the result of recognition is output, i.e., outputting the term (work or phrase) corresponding to the reference sample having the least difference form the speech to be tested. Said discretion calculation and discretion determination are carried out according to the formulas described in "Determination of the result of recognition" (17) illustrated in FIG. 1. Modules (65) and (66) correspond to "Determination of the result of recognition" (17).

We claim:

1. A speaker dependent and independent speech recognition method, based on a comparison between speech characteristic parameter frames and a plurality of reference samples which are generated from a speaker in dependent recognition or from a plurality of persons having representative sounds in independent recognition, comprising the steps of:
   a) converting speech signals into a series of primitive sound spectrum parameter frames;
   b) determining beginning and ending points of sounds of speech according to said primitive sound parameter frames, for determination of a sound spectrum parameter frame series;
   c) performing non-linear time domain normalization on said sound spectrum parameter frame series into a speech characteristic parameter frame series of predefined length on the time domain, including: forming a sound stimulus series corresponding to said sound spectrum parameter frame series, selecting or deleting each sound spectrum parameter frame, respectively, according to whether a sound stimulus value of said sound spectrum parameter frame is greater or less than an average sound stimulus value, wherein said sound stimulus value represents the difference between two adjacent sound spectrum parameter frames, and wherein said average sound stimulus value is the average of all of said sound stimulus values;
   d) performing amplitude quantizing normalization on said speech characteristic parameter frames obtained from step c);
   e) comparing said speech characteristic parameter frame series of step d) with each of a plurality of reference samples, said plurality of reference samples having previously been subjected to amplitude quantizing normalization, for determining a reference sample having a closest match with said speech characteristic parameter frame series; and
   f) determining a result of recognition according to said reference sample having said closest match.

2. The speech recognition method according to claim 1, further comprising the steps of calculating syllables of sound of the speech according to variation of said sound stimulus value, and determining a reference sample having said closest match with said speech characteristic parameter frame series with syllables being closest to said syllables of sound of the speech.

3. The speech recognition method according to claim 1 in which, after said step of amplitude quantizing normalization of said plurality of reference samples for independent recognition, further comprising the steps of: reducing said plurality of reference samples by a clustering process.

4. The speech recognition method according to claim 1, wherein, said sound spectrum parameter is one of a sampling value and a frequency spectrum slope which is a difference of adjacent frequency components.

5. The speech recognition method according to claim 4, wherein said amplitude quantizing normalization of the speech characteristic parameter frame normalizes each frequency component value of said speech characteristic parameter frame to one bit;
   when the sound spectrum parameter is the sampling value, the rule for quantizing normalization is: the frequency components less than a average frequency component value are normalized to 0, and otherwise they are normalized to 1;
   when the sound spectrum parameter is the frequency spectrum slope, the rule for quantizing normalization is: the frequency components less than 0 are normalized to 0, and otherwise they are normalized to 1.

6. The speech recognition method according to claim 5, wherein in said step of determining a reference sample most closely matching with the speech characteristic parameter frame series, calculating a Hamming distance between each of the plurality of reference samples and the speech characteristic parameter frame series.

7. The speech recognition method according to claim 6, wherein said step of determining a result of recognition includes finding a difference between a least distance and a second least distance, and when said difference is less than a specified threshold, then recognition is rejected, otherwise the result of recognition is accepted.

8. The speech recognition method according to claim 7, wherein, said discretion is the difference of the second least distance and the least distance divided by the least distance, preferred value of said threshold is 0.1.

9. The speech recognition method according to claim 1, wherein said non-linear time domain normalization comprises:
   a) using a sound stimulus accumulator and setting it to 0;
   b) sequentially retrieving a next sound stimulus, and adding it to said sound stimulus accumulator;
   c) when the value of said sound stimulus accumulator is at least equal to an average sound stimulus, then the frame corresponding to this sound stimulus is selected, and the value of said sound stimulus accumulator is decreased by an amount equal to said average sound stimulus, and step b) is repeated;
   d) when said value of said sound stimulus accumulator is less than said average sound stimulus, then the frame corresponding to this sound stimulus is not selected, and step b) is repeated.

10. A speaker dependent and independent speech recognition apparatus based on a comparison between speech characteristic parameter frames and reference samples which are generated from one of a speaker in dependent recognition and from persons producing representative sounds in independent recognition, comprising:
   a) a speech parameter extracting means for converting speech signals into a series of primitive sound spectrum parameter frames;
   b) determining means for determining beginning and ending points of sounds of speech based on said series of primitive sound spectrum parameter frames, for obtaining a sound spectrum parameter frame series;
   c) time domain normalization means for normalizing said sound spectrum parameter frame series into a speech characteristic parameter frame series of predefined length on the time domain including: forming a sound stimulus series corresponding to said sound spectrum parameter frame series, selecting or deleting each sound spectrum parameter frame, respectively, according to whether a sound stimulus value of said sound spectrum parameter frame is greater or less than an average sound stimulus value, wherein said sound stimulus value represents the difference between two adjacent sound spectrum parameter frames, and wherein said average sound stimulus value is the average of all of said sound stimulus values;
   d) quantizing normalization means for performing amplitude quantizing normalization on each frame of said speech characteristic parameter frame series;
   e) difference evaluation means for comparing said speech characteristic parameter frame series with said plurality of reference samples, for determining a reference sample having a closest match with said speech characteristic parameter frame series of equal length on the time domain; and
   f) judgement means for determining a result of recognition according to said reference sample having said closest match.

11. The speech recognition apparatus according to claim 10 further comprising: number of syllables determining means for calculating syllables of sound of the speech according to variations of said sound stimulus, and sending the output to a difference evaluation means; and difference evaluation means for determining said reference sample having said closest match with said speech characteristic parameter frame series with syllables being closest to said syllables of sound of the speech.

12. The speech recognition apparatus of claim 10, further comprising reference sample optimization means for reducing the plurality of reference samples by a clustering process in use of the speaker independent speech recognition.

13. The speech recognition apparatus according to claim 10, wherein said speech parameter extraction means comprising at least:
   a sound-electricity converting means;
   a high and low frequency raising means, the input of which being coupled with the output of said sound-electricity converting means;
   a plurality of filtering means for extracting different speech frequency components, the inputs of which being coupled with the output of said high and low frequency raising means; and
   an A/D converting means, the input of which being coupled with said plurality of filtering means, and the output of which being sent to said speech beginning and ending points determining means.

14. The speech recognition apparatus according to claim 10, wherein said time domain normalization means performs the following steps:
   a) setting a sound stimuli accumulator to have a value of zero;
   b) fetching sequentially a next sound stimulus, and adding it to said sound stimuli accumulator;
   c) if said accumulator is not less than the average sound stimulus, then the frame corresponding to this sound stimulus is selected, and the value of said sound stimulus accumulator is decreased by an amount equal to said average sound stimulus, and step b) is repeated;
   d) if said stimulus accumulator is less than said average sound stimulus, then the frame corresponding to this sound stimulus is not selected, and step b) is repeated.

15. The speech recognition apparatus according to claim 10, wherein said quantizing normalization means normalizes each component value of said speech characteristic parameter frame to one bit.

16. The speech recognition apparatus according to claim 15, wherein said difference evaluation means uses Hamming distance to calculate difference between said reference samples and said speech characteristic parameter frame series.

17. The speech recognition apparatus according to claim 16, wherein said judgement means finds discretion between the found least distance and the second least distance, and rejects recognition when said discretion is less than a specified threshold, otherwise justifies recognition result.

18. The speech recognition apparatus according to claim 17, wherein, said discretion is the difference between the second least distance and the least distance divided by the least distance, the preferred value of said threshold is 0.1.

* * * * *